Figure 1:
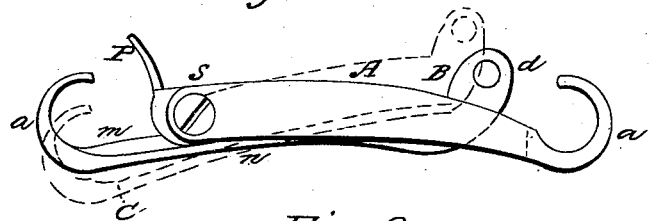
Figure 2:
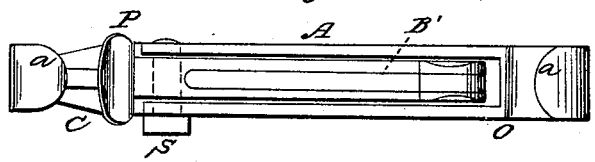
Figure 3:
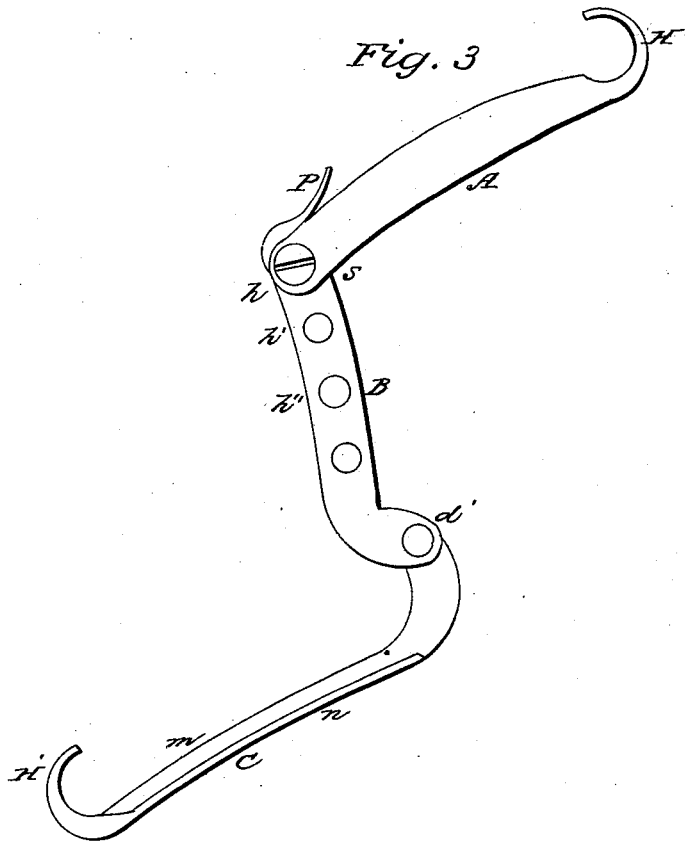

AUSTIN & PERRY.

Hame Fastener.

No. 95,410. Patented Oct. 5, 1869.

Witnesses:

Inventors:
Harrison W. Austin
&
Edwin C. Perry

United States Patent Office.

HARRISON W. AUSTIN AND EDWIN C. PERRY, OF PORTAGE TOWNSHIP; EDWIN C. PERRY, ASSIGNOR TO GUY T. NASH, OF KALAMAZOO, MICHIGAN.

Letters Patent No. 95,410, dated October 5, 1869.

IMPROVED HAMES-FASTENER.

The Schedule referred to in these Letters Patent and making part of the same.

*To all whom it may concern:*

Be it known that we, HARRISON W. AUSTIN and EDWIN C. PERRY, of the township of Portage, in the county of Kalamazoo, and State of Michigan, have invented a new and improved Hames-Fastener for Harness; and we do hereby declare that the following is a full and exact description thereof, reference being had to the accompanying drawings, and to the letters of reference marked thereon.

This invention relates to that class of hames-fasteners, in which three pieces are employed, which fit together, and consists in so constructing the parts that the device will lock itself, as will be fully described hereinafter.

To enable others skilled in the art to make and use our invention, we will now proceed to describe its construction and operation.

We construct the parts of our invention, as shown at A, B, and C, in the accompanying drawings, from malleable iron or other desirable metal, in such a manner as, when attached and operated, they will close or shut together, forming a double lock-joint, performing the object desired, as hereinafter more particularly set forth.

We construct the part A, as shown in the accompanying drawings, the desired length, and a little curved, with one end turned over in form of a hook, for the purpose of attaching to the ring in the end of the hames, as shown in the accompanying drawings, at H.

From the hook H, just described, through the centre of the part A, to the other end, we cut out, leaving an opening between the two sides thus formed, as shown at O, in accompanying drawings. The use and purpose of this opening are to admit of the part B, hereafter described, shutting or closing into it in the operation of the hames-fastener, as hereinafter set forth and described.

At the opposite end from the hook H, in the part A, we make a hole, to admit a small screw in attaching the parts A and B, as hereafter set forth, as shown at S, accompanying drawings.

We construct the second part B in shape and form similar to the part A, but not quite so long nor so wide, so that it will pass between the sides of part A, formed by the opening above specified, and shut into the same in the operation, as shown at B, accompanying drawings. This part we make with a similar opening to that of part A, by cutting out the centre, as above described, but not so large. The purpose of this opening is to admit the part C, hereafter set forth, to close or shut into in operating the fastener, as shown at B', accompanying drawings.

At one end, as shown at *d*, we make an angle-joint, turning it up short, for the purpose and to form a more perfect and convenient hinge or joint, in attaching to the part C, as hereafter described.

At given distances along through the sides we make holes, as shown at *h h'*, &c., the purpose and use of which are to lengthen or shorten the hames-fastener, as found necessary in operating, by means of shifting the part A on to part B, with the screw S, as shown in accompanying drawings.

At the other end we make a thumb-piece, projecting out at an angle with the part B, as shown at P, the use and purpose of which are to more conveniently handle the hames-fastener, in its operation and working.

The third part, C, we construct as shown in accompanying drawing, in shape and form to fit and shut inside the opening of part B, as above described in the operation.

At one end, turned up to an angle corresponding to that in part B, as shown at *d*, and at the opposite end we construct a hook, as shown at H', like that as shown at H, on part A, the purpose of which is to catch into the end of the other hames in operating the fastener.

Between the two ends of the part C, just described, we make sufficiently small and narrow to conform to the opening, into which it closes in working the fastener, as shown at *m*, accompanying drawings; and along the side of the part C, as shown at *n*, we construct a flange projection, extending a little out from the narrow part *n*, on both sides, as shown in accompanying drawings. The object of this projection just described is to prevent the narrow piece *m*, above described, going beyond the holes *h h'*, &c., in part B, when closed into the opening, as above specified, and to more perfectly finish and form a back to the fastener when in operation, pressing against the collar.

We operate our invention in the following manner:

We attach the parts B and C by a rivet at *d*, forming an angle-joint, and the part A on the part B, at one of the holes *h h'*, &c., as desired, by means of the screw S, as shown in the accompanying drawings. Fasten one of the hooks H and H' into the ring on the end of one of the hames, so that when closing the parts together in the operation, as above specified, the flange projection *n* will come in contact with the collar. Then, drawing out the parts of the fastener by a slight pull on the thumb-piece P, the length is extended, and we then catch the other hook, as above specified, into the ring on the end of the other hames. Pull on the thumb-piece P, and the object desired is accomplished, viz, the part C shuts into the part B, and that into the part A, in their respective places, holding tightly and firmly the hames, without danger of coming apart themselves in using, for the reason that when in operation, the strain from the hames comes upon the parts of the fastener inside of its centre that is next the collar; and the tendency is, when the parts are closed on to the hames, to draw up and tighten, rather than draw down and unfasten.

This is an advantage gained over other devices designed for the same purpose, to wit, in its being perfectly safe and reliable, and also in its shutting or closing together, making it more convenient and practical.

The operation of unfastening our hames-fastener, is simply by a slight pull on the projection P, till the strain comes on the parts outside, rather than inside the centre, as above described, when it immediately lengthens and relieves itself, leaving the hames free.

What we claim as our invention, and desire to secure by Letters Patent, is—

The bar C, provided with the ridge m, when so arranged as to shut into the slotted bar B, and, in connection with the latter, to swing its inner end through the bar A, and, moving inside the line of draught, thus make itself self-locking, the whole being constructed and arranged as described.

HARRISON W. AUSTIN.
EDWIN C. PERRY.

Witnesses:
O. T. TUTHILL,
GUY T. NASH.